(12) United States Patent
Mantin

(10) Patent No.: US 8,566,604 B2
(45) Date of Patent: Oct. 22, 2013

(54) PASSWORD PROTECTION

(75) Inventor: Itsik Mantin, Shoham (IL)

(73) Assignee: Cisco Technology Inc, San Jose, CA (US)

( * ) Notice: Subject to any disclaimer, the term of this patent is extended or adjusted under 35 U.S.C. 154(b) by 1019 days.

(21) Appl. No.: 12/228,610

(22) Filed: Aug. 14, 2008

(65) Prior Publication Data

US 2009/0019540 A1    Jan. 15, 2009

Related U.S. Application Data

(63) Continuation of application No. PCT/IL2006/001153, filed on Oct. 3, 2006.

(30) Foreign Application Priority Data

Mar. 29, 2006 (IL) .......................................... 174619

(51) Int. Cl.
*G06F 21/00* (2013.01)

(52) U.S. Cl.
USPC ................................ 713/184; 726/5; 713/182

(58) Field of Classification Search
USPC ........................ 713/182–184; 726/5–7, 17–19
See application file for complete search history.

(56) References Cited

U.S. PATENT DOCUMENTS

| | | | |
|---|---|---|---|
| 5,394,471 A | 2/1995 | Ganesan et al. | |
| 6,079,021 A | 6/2000 | Abadi et al. | |
| 6,959,394 B1 * | 10/2005 | Brickell et al. | 726/5 |
| 6,996,718 B1 * | 2/2006 | Henry et al. | 713/182 |
| 2003/0163733 A1 * | 8/2003 | Barriga-Caceres et al. | 713/201 |
| 2004/0098628 A1 * | 5/2004 | Butler | 713/202 |
| 2005/0160297 A1 * | 7/2005 | Ogawa | 713/202 |
| 2005/0250473 A1 | 11/2005 | Brown et al. | |
| 2006/0020796 A1 | 1/2006 | Aura et al. | |
| 2007/0157028 A1 * | 7/2007 | Lott | 713/182 |
| 2007/0226784 A1 * | 9/2007 | Ueda et al. | 726/5 |

FOREIGN PATENT DOCUMENTS

| | | |
|---|---|---|
| EP | 1 416 666 A1 | 5/2004 |
| EP | 1 469 369 A2 | 10/2004 |
| WO | WO 2005/083610 A1 | 9/2005 |

OTHER PUBLICATIONS

Jun. 10, 2010 Office Communication in connection with prosecution of CN 2006 80053862.4 (w/English translation) (4 pages).
Aug. 15, 2007 International Search Report for PCT/IL2006/001153.

(Continued)

*Primary Examiner* — Nirav B Patel
(74) *Attorney, Agent, or Firm* — Husch Blackwell LLP

(57) ABSTRACT

An authentication system, including a pattern module to provide a pattern, a function module to provide a one-way function having a plurality of input and output values, a function processor to find one of the input values for the one-way function such that a corresponding one of the output values has the pattern, a password module to provide the one input value as a password for use in password authentication against the one output value, the one output value being a check value having a length, a compression module to determine a storage value such that: the check value can be reconstructed from the storage value and the pattern, and the storage value has a length which is shorter than the length of the check value, and a storage module to store the storage value in a storage medium for later retrieval. Related apparatus and methods are also included.

10 Claims, 12 Drawing Sheets

(56) References Cited

OTHER PUBLICATIONS

Aug. 15, 2007 Written Opinion of the International Searching Authority for PCT/IL2006/001153.

Gershon Kedem, et al., "Brute Force Attack on Unix Passwords with SIMD Computer" *Proceedings of The 8th USENIX Security Symposium* (Aug. 1999).

Jeffrey Kutler, "Electronic Commerce: Vendors to Use Intel Serial Number Design" *American Banker*, vol. 164, No. 40 (Mar. 19, 1999).

Nov. 16, 2011 Office Communication in connection with prosecution of EP 06 79 6146.6.

Feb. 25, 2013 Office Communication in connection with prosecution of EP 06 79 6146.6.

Mar. 4, 2013 Office Communication in connection with prosecution of EP 12 199 134.3.

* cited by examiner

PASSWORD PROTECTION

The present application is a continuation application of PCT/IL2006/001153, filed on 3 Oct. 2006 and entitled "Password Protection", which was published on 4 Oct. 2007 in the English language with International Publication Number WO 2007/110853 and which relies for priority on Israel Patent Application No. 174619, filed on 29 Mar. 2006.

FIELD OF THE INVENTION

The present invention relates to password protection, and in particular relates to password protection using one-way functions.

BACKGROUND OF THE INVENTION

By way of introduction, secure systems typically use passwords (textual and/or binary) to control access to system resources. In a basic system, the password is typically stored in the system for authenticating a candidate password by comparing the received candidate password against the stored password. A vulnerability of the basic system is that an attacker who obtains access to the system can find the stored password and use it at a later point to access the system.

A common solution to the above problem is to calculate a hash value of the password using a hash function and then store the hash value. A candidate password received by the system is first processed by the hash function giving an output value. The output value is then compared to the stored hash value. Therefore, an attacker that penetrates the system will only find the hash value which cannot be used as the access password.

The stored hash value is preferably stored in non-volatile memory (NVM) for example, but not limited to, fuses and OTP (one-time programmable) memory. In many devices the available NVM is typically limited and therefore it is desirable to keep the amount of storage space used for the stored hash value as small as possible. However, reducing the size of the stored hash value normally means reducing the security level provided by the hash value, as will be explained below.

When a typical hash function maps a password (input value) to a hash value (output value), the security of the system is proportional to the number of bits of the hash value. For example, if the hash value has 32 bits, then on average it takes $2^{32}$ (approximately 4 billion) trials in order to find a password (which is not necessarily the original password) that maps to the hash value using the hash function.

Therefore, it takes approximately 4 billion trials for an attacker to find a password which maps to the stored hash value. The exact time it takes to perform 4 billion trials depends on the speed of the processor being used as well as the complexity of the hash function. Nevertheless, 4 billion trials would not take very long using a standard personal computer and therefore a 32 bit hash value probably does not provide sufficient security for most scenarios. Therefore, the hash value needs to be long enough to ensure sufficient security.

Therefore, there is a tradeoff between security and cost of the storage space.

The following reference is believed to represent the state of the art:

US Published Patent Application 2005/0250473 of Brown, et al.

The disclosures of the references mentioned above and throughout the present specification, as well as the disclosures of all references mentioned in the references, are hereby incorporated herein by reference.

SUMMARY OF THE INVENTION

The present invention seeks to provide an improved password protection system using one-way functions.

The system of the present invention, in preferred embodiments thereof, provides password authentication using a one-way function, for example, but not limited to, a cryptographic hash function, such as SHA-1 or MD5.

A one-way function is a function that is quicker to compute in the forward direction (from input to output) than in the inverse direction (from output to input). For the purposes of the present application, the term one-way function as used in the specification and claims is defined as a mathematical function which is at least 1000 times quicker to compute in the forward direction than in the inverse direction. In accordance with a preferred embodiment of the present invention, a one-way function is used which is at least a million times quicker to compute in the forward direction than in the inverse direction.

The one-way function preferably has a plurality of input values and a plurality of output values. An input value of the one-way function is typically selected such that an output value of the one-way function has a predetermined pattern. As the output value has a predetermined pattern, the output value can generally be reconstructed from only part of the information of the output value and knowledge of the pattern. Therefore, in order to use the output value as a check value in password authentication against a candidate password, only part of the information of the output value typically needs to be stored. The part of the information, which needs to be stored, is preferably stored in a storage value. The storage value optionally includes an indicator of the pattern used in reconstructing the check value.

Therefore, if the check value has x bits, then the storage value preferably only has y bits, wherein x is greater than y, preferably x is at least 20 bits longer than y. For example, if the check value has 64 bits offering 64 bit security and the pattern has 32 bits, then the storage value may only need 32 bits. Therefore, 64 bits of security is obtained with 32 bits of storage.

A hidden cost of the preferred embodiment of the present invention is preprocessing in order to find the password. In the above example, it will take approximately $2^{32}$ (approximately 4 billion) trials in order to find a password such that the output value includes the 32 bit pattern. However, where storage is limited and/or expensive, preprocessing is generally considered to be relatively cheap.

In accordance with an alternative preferred embodiment of the present invention, the pattern is based on a value already being used by the system for non-password use, for example, but not limited to, a chip serial number, an RFID serial number and/or configuration bits of one-time programmable (OTP) memory.

In accordance with another alternative preferred embodiment of the present invention, the password only storage cost is reduced by using part of the check value for a non-password use, for example, but not limited to, a definable identification number such as a chip serial number which can be defined by a chip manufacturer.

The system of the present invention, in preferred embodiments thereof, is generally suitable for use with binary passwords and/or with systems having fixed passwords, for example, but not limited to, test mode passwords and diagnostic passwords typically having fixed check values written to OTP or read-only memory (ROM). The system of the present invention, in preferred embodiments thereof, is generally, but not exclusively, suitable for passwords not requiring human memorization.

Additionally, the system of the present invention, in preferred embodiments thereof, is also generally very useful for low resource hardware, for example, but not limited to radio frequency identification (RFID) tags and chips for Integrated Receiver-Decoders (IRDs).

There is thus provided in accordance with a preferred embodiment of the present invention, an authentication system, including a pattern module to provide a pattern, a function module to provide a one-way function having a plurality of input values and a plurality of output values, a function processor to find one of the input values for the one-way function such that a corresponding one of the output values has the pattern, a password module to provide the one input value as a password for use in password authentication against the one output value, the one output value being a check value, the check value having a length, a compression module to determine a storage value such that the check value can be reconstructed from the storage value and the pattern, and the storage value has a length which is shorter than the length of the check value, and a storage module to store the storage value in a storage medium for later retrieval.

Further in accordance with a preferred embodiment of the present invention the storage value includes an indicator of the pattern.

Still further in accordance with a preferred embodiment of the present invention the pattern includes a string of pre-defined values in a predefined order.

Additionally in accordance with a preferred embodiment of the present invention the storage value is void of the complete string.

Moreover in accordance with a preferred embodiment of the present invention the string has a non-password use.

Further in accordance with a preferred embodiment of the present invention the non-password use is for identification.

Still further in accordance with a preferred embodiment of the present invention the string forms at least half of a chip serial number.

Additionally in accordance with a preferred embodiment of the present invention the string forms at least part of a serial number of an RFID tag.

Moreover in accordance with a preferred embodiment of the present invention the string forms at least part of a set of configuration bits.

Further in accordance with a preferred embodiment of the present invention at least part of the storage value has a non-password use.

Still further in accordance with a preferred embodiment of the present invention the non-password use is for identification.

Additionally in accordance with a preferred embodiment of the present invention the at least part of the storage value forms at least half of a chip serial number.

Moreover in accordance with a preferred embodiment of the present invention, the system includes a password receiver to receive a candidate password, the function processor being operative to determine one of the output values, with the candidate password as a corresponding one of the input values, using the one-way function, a retrieval module to retrieve the storage value from the storage medium, and an authentication module to compare the one output value for the candidate password to the storage value taking the pattern into account.

Further in accordance with a preferred embodiment of the present invention, the system includes a reconstruction module to reconstruct the check value from the storage value and the pattern, wherein the authentication module is operative to compare the one output value for the candidate password to the check value.

Still further in accordance with a preferred embodiment of the present invention the compression module is operative to compress the one output value yielding a compressed value which is void of the pattern, the authentication module being operative to compare the compressed value to the storage value.

Additionally in accordance with a preferred embodiment of the present invention the storage value includes an indicator of the pattern.

Moreover in accordance with a preferred embodiment of the present invention the pattern includes a string of pre-defined values in a predefined order.

Further in accordance with a preferred embodiment of the present invention the storage value is void of the complete string.

Still further in accordance with a preferred embodiment of the present invention the string has a non-password use.

Additionally in accordance with a preferred embodiment of the present invention the non-password use is for identification.

Moreover in accordance with a preferred embodiment of the present invention the string forms at least half of a chip serial number.

Further in accordance with a preferred embodiment of the present invention the string forms at least part of a serial number of an RFID tag.

Still further in accordance with a preferred embodiment of the present invention the string forms at least part of a set of configuration bits.

Additionally in accordance with a preferred embodiment of the present invention at least part of the storage value has a non-password use.

Moreover in accordance with a preferred embodiment of the present invention the non-password use is for identification.

Further in accordance with a preferred embodiment of the present invention the at least part of the storage value forms at least half of a chip serial number.

There is also provided in accordance with still another preferred embodiment of the present invention an authentication system, including a function module to provide a one-way function having a plurality of input values and a plurality of output values, a password module to provide one of the input values as a password for use in password authentication against a corresponding one of the output values, the one output value being a check value, a function processor to determine the check value for the password using the one-way function, and a storage module to store the check value in a storage medium for later retrieval, wherein at least part of the stored check value has a non-password use.

Still further in accordance with a preferred embodiment of the present invention the non-password use is for identification.

Additionally in accordance with a preferred embodiment of the present invention the at least part of the check value forms at least half of a chip serial number.

Moreover in accordance with a preferred embodiment of the present invention, the system includes a password receiver to receive a candidate password, a retrieval module to retrieve the check value from the storage medium, the function processor being operative to determine one of the output values, with the candidate password as a corresponding one of the input values, using the one-way function, and an authentication module to compare the one output value for the candidate password to the check value.

Further in accordance with a preferred embodiment of the present invention the non-password use is for identification.

Still further in accordance with a preferred embodiment of the present invention the at least part of the check value forms at least half of a chip serial number.

There is also provided in accordance with still another preferred embodiment of the present invention an authentication system, including a storage medium to store a storage value for use in password authentication, a password receiver to receive a candidate password for checking against a check value in the password authentication, a retrieval module to retrieve the storage value from the storage medium, a pattern module to provide a pattern, a function module to provide a one-way function having a plurality of input values and a plurality of output values, a function processor to determine one of the output values, with the candidate password as a corresponding one of the input values, using the one-way function, and an authentication module to compare the one output value for the candidate password to the storage value taking the pattern into account.

Additionally in accordance with a preferred embodiment of the present invention, the system includes a reconstruction module to reconstruct the check value from the storage value and the pattern, wherein the authentication module is operative to compare the one output value for the candidate password to the check value.

Moreover in accordance with a preferred embodiment of the present invention, the system includes a compression module to compress the one output value yielding a compressed value which is void of the pattern, wherein the authentication module is operative to compare the compressed value to the storage value.

Further in accordance with a preferred embodiment of the present invention the storage value includes an indicator of the pattern.

Still further in accordance with a preferred embodiment of the present invention the pattern includes a string of predefined values in a predefined order.

Additionally in accordance with a preferred embodiment of the present invention the storage value is void of the complete string.

Moreover in accordance with a preferred embodiment of the present invention the string has a non-password use.

Further in accordance with a preferred embodiment of the present invention the non-password use is for identification.

Still further in accordance with a preferred embodiment of the present invention the string forms at least half of a chip serial number.

Additionally in accordance with a preferred embodiment of the present invention the string forms at least part of a serial number of an RFID tag.

Moreover in accordance with a preferred embodiment of the present invention the string forms at least part of a set of configuration bits.

Further in accordance with a preferred embodiment of the present invention at least part of the storage value has a non-password use.

Still further in accordance with a preferred embodiment of the present invention the non-password use is for identification.

Additionally in accordance with a preferred embodiment of the present invention the at least part of the storage value forms at least half of a chip serial number.

There is also provided in accordance with still another preferred embodiment of the present invention an authentication system, including a storage medium to store a check value for use in password authentication, wherein at least part of the stored check value has a non-password use, a password receiver to receive a candidate password for checking against the check value in the password authentication, a retrieval module to retrieve the check value from the storage medium, a function module to provide a one-way function having a plurality of input values and a plurality of output values, a function processor to determine one of the output values, with the candidate password as a corresponding one of the input values, using the one-way function, and an authentication module to compare the one output value for the candidate password to the check value.

Moreover in accordance with a preferred embodiment of the present invention the non-password use is for identification.

Further in accordance with a preferred embodiment of the present invention the at least part of the check value forms at least half of a chip serial number.

Still further in accordance with a preferred embodiment of the present invention the one-way is a cryptographic hash function and wherein the output values are hash values.

There is also provided in accordance with still another preferred embodiment of the present invention a password generation method, including providing a pattern, providing a one-way function having a plurality of input values and a plurality of output values, determining one of the input values for the one-way function such that a corresponding one of the output values has the pattern, providing the one input value as a password for use in password authentication against the one output value, the one output value being a check value, the check value having a length, determining a storage value such that the check value can be reconstructed from the storage value and the pattern, and the storage value has a length which is shorter than the length of the check value, and storing the storage value in a storage medium for later retrieval.

There is also provided in accordance with still another preferred embodiment of the present invention a authentication method, including providing a one-way function having a plurality of input values and a plurality of output values, providing one of the input values as a password for use in password authentication against a corresponding one of the output values, the one output value being a check value, determining the check value for the password using the one-way function, and storing the check value in a storage medium for later retrieval, wherein at least part of the stored check value has a non-password use.

There is also provided in accordance with still another preferred embodiment of the present invention a authentication method, including storing a storage value for use in password authentication, receiving a candidate password for checking against a check value in the password authentication, providing a one-way function having a plurality of input values and a plurality of output values, determining one of the output values, with the candidate password as a corresponding one of the input values, using the one-way function, retrieving the storage value from the storage medium, providing a pattern, and comparing the one output value for the candidate password to the storage value taking the pattern into account.

There is also provided in accordance with still another preferred embodiment of the present invention a authentication method, including storing a check value for use in password authentication, wherein at least part of the stored check value has a non-password use, receiving a candidate password for checking against the check value in the password authentication, retrieving the check value from the storage medium, providing a one-way function having a plurality of input values and a plurality of output values, determining one of the output values, with the candidate password as a corresponding one of the input values, using the one-way function, and comparing the one output value for the candidate password to the check value.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
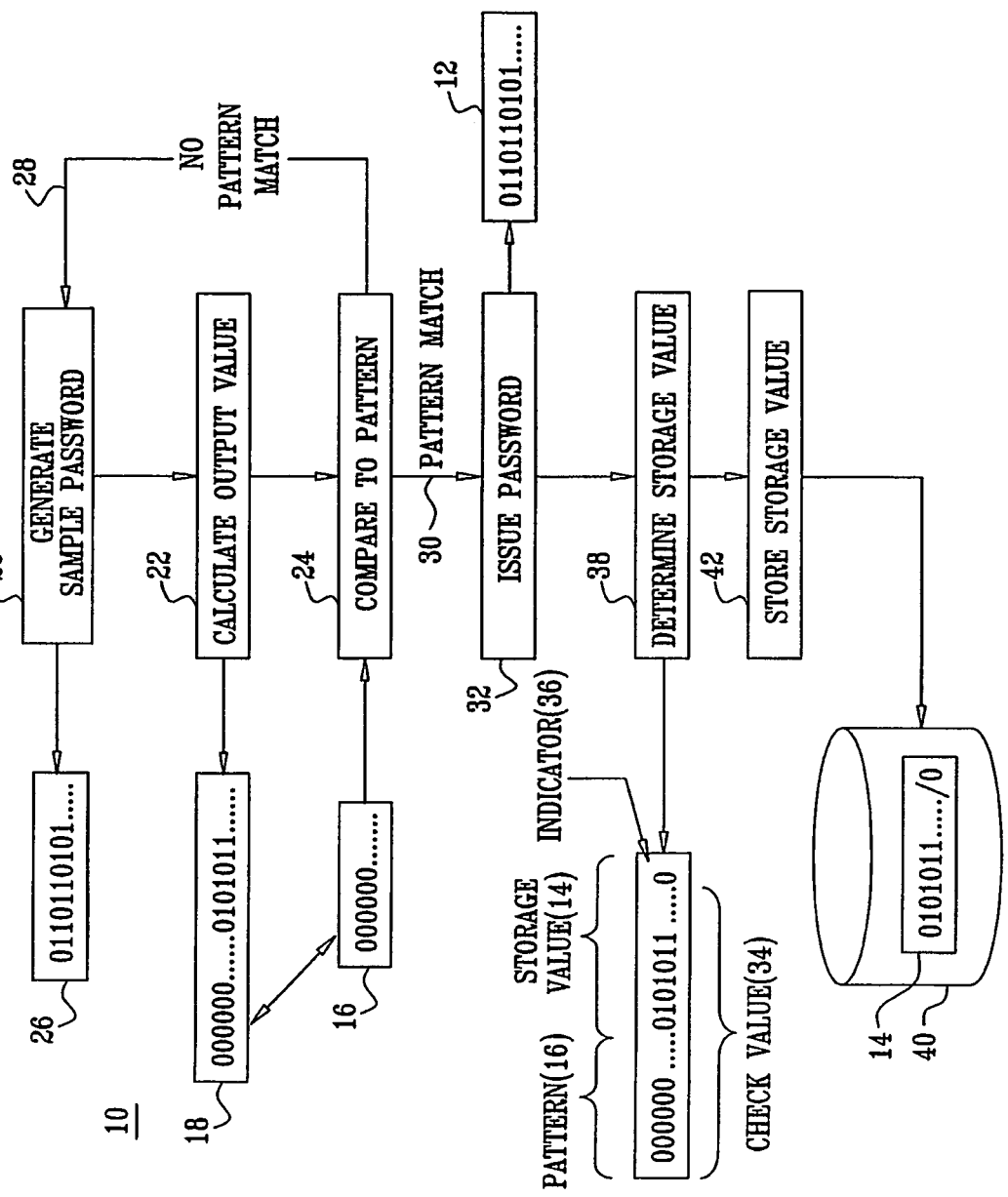
FIG. 1 is a partly pictorial, partly block diagram view of an authentication system constructed and operative in accordance with a preferred embodiment of the present invention determining a password and an associated storage value based on a pattern.

Reference is now made to FIG. 1, which is a partly pictorial, partly block diagram view of an authentication system 10 constructed and operative in accordance with a preferred embodiment of the present invention determining a password 12 and an associated storage value 14 based on a pattern 16.

First, a sample password 26 is provided (block 20) typically by a pseudo-random number generator (not shown). The password 26 is preferably processed by a one-way function producing an output value 18 (block 22).

The one-way function preferably has a plurality of input values and output values. The one-way function is preferably a cryptographic hash function for example, but not limited to SHA-1 or MD5, the output values being hash values. However, it will be appreciated by those ordinarily skilled in the art that the one-way function can be any suitable one-way function complying with the definition of a one-way function described in the summary of the invention section.

If the authentication system 10 does not have a hash function implemented, but does have a block cipher implemented, for example, but not limited to, AES, the one-way function may be implemented in one of the following ways.

A first option is to encrypt the sample password 26 and then perform an exclusive-OR operation with the output of the encryption operation and the sample password 26.

A second option is to encrypt a constant value (for example, but not limited to, zero) with the sample password 26 as the encryption key.

A third option is to encrypt a constant value (for example, but not limited to, zero) with the sample password 26 as the encryption key and then perform an exclusive-OR operation with the output of the encryption operation and the sample password 26. It will be appreciated by those ordinarily skilled in the art that there are numerous suitable ways to build a one-way function from a block cipher.

The above options have been described with reference to the sample password 26 of the authentication system 10 as an input to the functions. However, it will be appreciated by those ordinarily skilled in the art that the above options may be used with any of the preferred embodiments of the present invention.

For low resource devices such as RFIDs or chips of IRDs, a one-way function can be simulated for example using the following function which maps a 64 bit input X to 64 bit output Z, by way of example only:

Y=X∥X (Y is a 128 bit register))

In other words, Y is equal to concatenating 2 copies of X.

Y'=Y XOR (Y<<5 AND Y<<36) XOR (Y<<14 OR Y<<45), wherein "<<" is a left cyclic shift operator.

Y"=Y'XOR (Y'<<34 NAND Y'<<41) XOR (Y'<<24 NOR Y'<<1)

Y'''=Y" XOR (Y"<<12 NAND Y"<<54) XOR (Y"<<28 OR Y"<<11)

Possibly 20 more operations of the above type giving a $Y_{final}$. The 64 bit output Z is given by $Y_{final}[0 \ldots 63]$ XOR $Y_{final}[64 \ldots 127]$. In other words, the 64 bit output Z is given by performing an XOR operation with the first 64 bits of $Y_{final}$ and the last 64 bits of $Y_{final}$.

It will be appreciated by those ordinarily skilled in the art that the length of the input and or output may be suitably changed and/or the individual steps of the function may be amended, The output value 18 is then typically compared with the pattern 16 to determine if the output value 18 has the pattern 16 (block 24).

If there is no pattern match, then the steps of blocks 20-24 are repeated (arrow 28).

If there is a pattern match (arrow 30), the sample password 26 is preferably designated as the password 12 for issuing for use in password authentication (block 32) against the output value 18. The output value 18 is typically defined as a check value 34.

In accordance with the preferred embodiment of the present invention, part of the output value 18 includes pattern 16, such that the output value 18 typically includes specific values in a predefined order, as defined by the pattern 16. In accordance with an alternative preferred embodiment of the present invention, the pattern 16 defines a pattern that the output value 18 should follow, for example, the first half of the output value 18 should equal the second half of the output value 18, or that the first half of the output value 18 is an inverse of the second half of the output value 18, or the first half of the output value 18 is a function of the second half of the output value 18. It will be appreciated by those ordinarily skilled in the art that the pattern 16 can define any suitable pattern for the output value 18.

As the check value 34 has the pattern 16, only part of the check value 34 needs to be stored in the storage value 14 for future password authentication use. Therefore, the storage value 14 is preferably determined such that the check value 34 can be reconstructed from the storage value 14 and the pattern 16 (block 38). The storage value 14 is therefore a compressed version of the check value 34. By way of a first example, if the first half of the check value 34 includes the pattern 16, then typically only the second half of the check value 34 needs to be stored in the storage value 14. By way of a second example, if the first half of the check value 34 is equal to the second half of the check value 34, then typically only one half of the check value 34 needs to be stored. The storage value 14 optionally includes an indicator 36 which provides an indication of the pattern 16. The storage value 14 has a length which is preferably shorter than a length of the check value 34.

Then, the storage value 14 is typically stored in a storage medium 40 for later retrieval (block 42).

The following advantage of the authentication system 10 is described by way of example only. If the check value 34 has 64 bits, the pattern 16 has 32 bits and the storage value 14 has 32 bits (plus one or more optional bits for the indicator 36), then the check value 34 provides 64 bit security whereas the storage value 14 is only 32 bits long plus the indicator 36. There is a preprocessing cost to find the password 12 such that the output value 18 includes the pattern 16. On average is will take $2^{32}$ (about 4 billion) trials to find the password 12 given the pattern 16. The preprocessing requirement is generally proportional to the size and/or complexity of the pattern 16.

It will be appreciated by those ordinarily skilled in the art that the size chosen for the check value 34 and the pattern 16 generally depends on various factors, including, by way of example only, the speed of the state of the art processors, the speed of the preprocessing device(s), the speed of the authenticating device(s), as well as the processing time and the strength of the one-way function.

Figure 2:
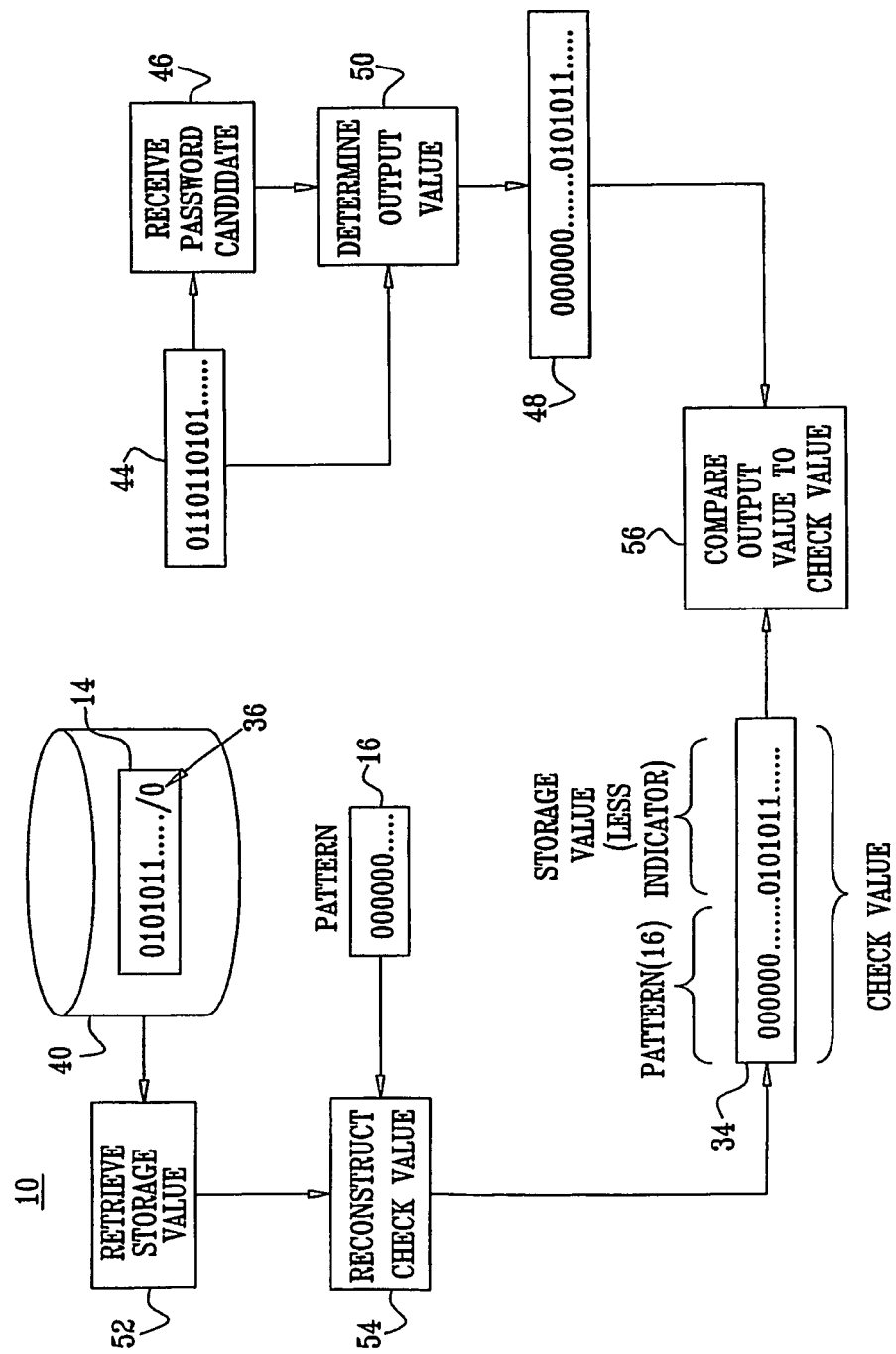
FIG. 2 is a partly pictorial, partly block diagram view of the authentication system of FIG. 1 authenticating a candidate password using the pattern of FIG. 1.

Reference is now made to FIG. 2, which is a partly pictorial, partly block diagram view of the authentication system 10 of FIG. 1 authenticating a candidate password 44 using the pattern 16 of FIG. 1. The method for authenticating the candidate password 44 is now described in more detail.

The candidate password 44 for checking against the check value 34 during password authentication is received (block 46).

An output value 48 is preferably determined, using the one-way function with the candidate password 44 as an input value to the one-way function (block 50).

The storage value 14 is typically retrieved from the storage medium 40 (block 52).

The check value 34 is generally reconstructed from the storage value 14 and the pattern 16 (block 54). The storage value 14 is a compressed version of the check value 34.

When the storage value 14 includes the indicator 36, the indicator 36 is preferably used to determine one or more aspects of the pattern 16. The indicator 36 is generally not included in the reconstructed check value 34.

Finally, the output value 48 for the candidate password 44 is preferably compared to the reconstructed check value 34 (block 56). The result of the password authentication is then typically sent to the device requesting authentication.

In accordance with an alternative preferred embodiment of the present invention, the check value 34 is not reconstructed from the storage value 14. The output value 48 is compared to the storage value 14 taking into account the pattern 16 using the indicator 36 (if appropriate). For example, the output value 48 is checked to ensure that the output value 48 has the pattern 16 using the indicator (if appropriate). The output value 48 is then compressed to yield a compressed value which is void of the pattern 16. The compressed value is then compared to the storage value 14.

Figure 3:
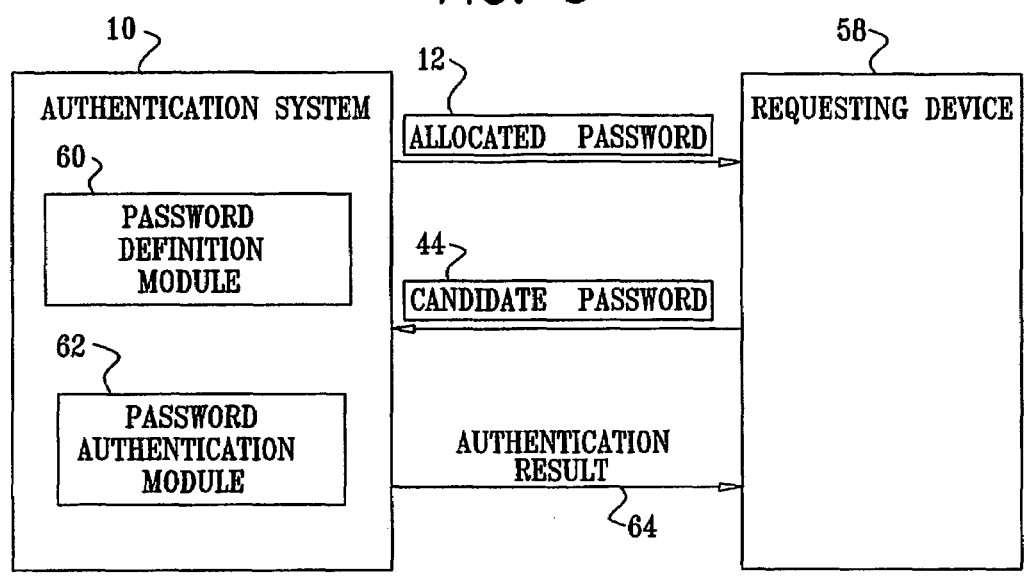
FIG. 3 is a block diagram view of the authentication system of FIG. 1 operating in a preferred mode of operation with a requesting device.

It will be appreciated by those ordinarily skilled in the art that there are many other suitable ways to compare the output value 48 with the storage value 14 taking the pattern 16 into account. Reference is now made to FIG. 3, which is a block diagram view of the authentication system 10 of FIG. 1 operating in a preferred mode of operation with a requesting device 58.

The authentication system 10 preferably includes a password definition module 60 and a password authentication module 62. The password definition module 60 typically performs the steps described with reference to the blocks 20-42 (FIG. 1). The password authentication module 62 generally performs the steps described with reference to the blocks 44-56 (FIG. 2).

After the password 12 has been determined by the password definition module 60, the authentication system 10 preferably sends the allocated password 12 to the requesting device 58.

The requesting device 58 typically sends the candidate password 44 to the authentication system 10 for authentication. The password authentication module 62 of the authentication system 10 preferably processes the authentication request of the requesting device 58 and then generally informs the requesting device 58 of the result of the authentication (arrow 64).

A password definition module and a password authentication module, including substantially the same functionality as the password definition module 60 and the password authentication module 62, are described in more detail with reference to FIGS. 9 and 10, respectively.

Figure 4:
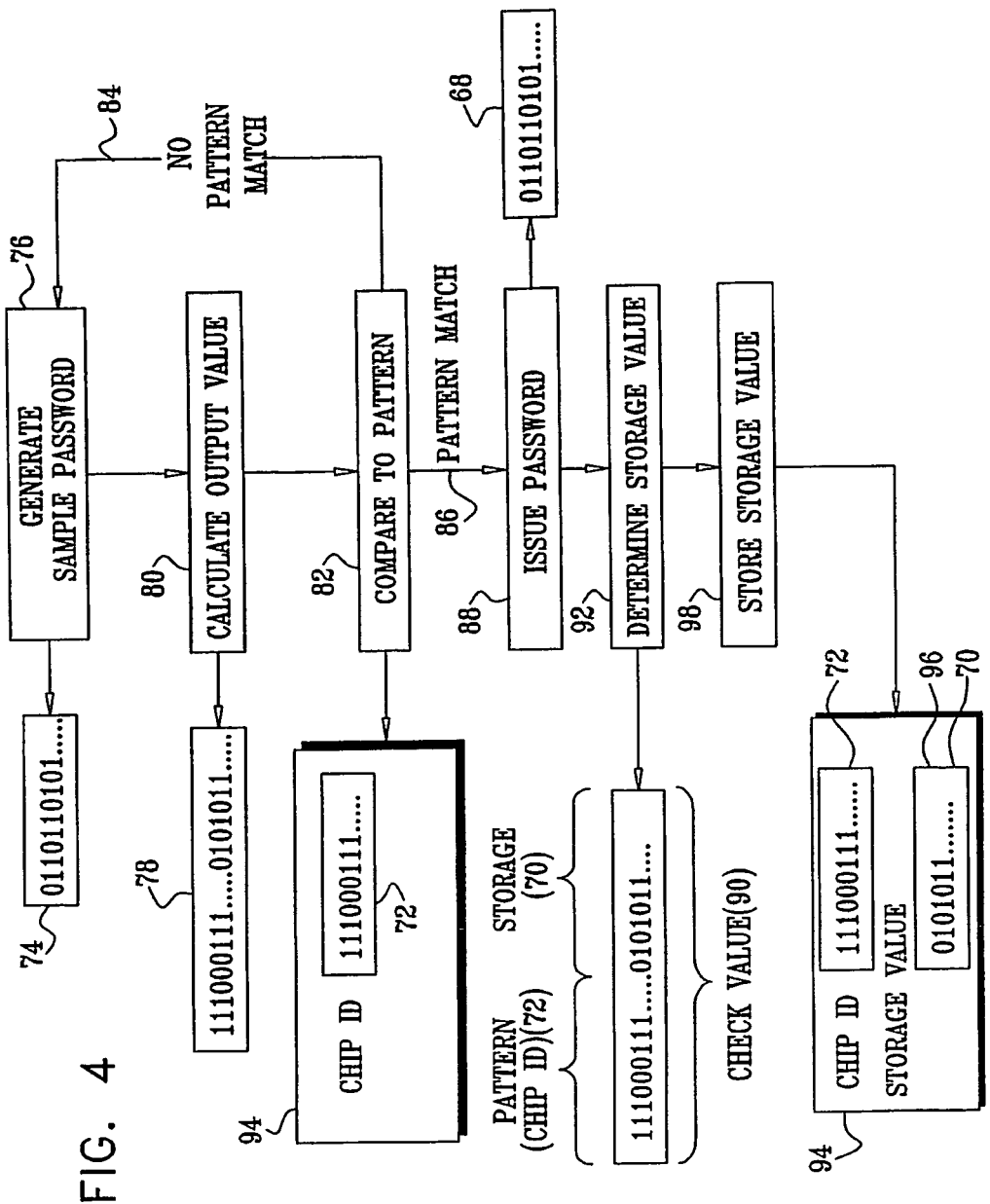
FIG. 4 is a partly pictorial, partly block diagram view of an authentication system constructed and operative in accordance with an alternative preferred embodiment of the present invention determining a password and an associated storage value based on a chip serial number.

Reference is now made to FIG. 4, which is a partly pictorial, partly block diagram view of an authentication system 66 constructed and operative in accordance with an alternative preferred embodiment of the present invention determining a password 68 and an associated storage value 70 based on a chip serial number 72 of a chip 94.

It should be noted that the term "chip serial number" as used in the specification and claims, is defined to include the use of any suitable characters, including alphanumeric and non-alphanumeric characters, for identifying a chip. The term "chip serial number" is sometimes known as a "chip ID".

The authentication system 66 is substantially the same as the authentication system 10 of FIGS. 1-3 except that with the authentication system 66, the password 68 is preferably determined by a pattern which is defined by the chip serial number 72.

In accordance with the alternative preferred embodiment of the present invention, the complete chip serial number 72 is typically used as the pattern. However, it will be appreciated by those ordinarily skilled in the art that a part of the chip serial number 72 can be used to define the pattern, for example half of the chip serial number 72.

The chip serial number 72 is an example of where the pattern has a non-password use, for example, but not limited to, identification. It will be appreciated by those ordinarily skilled in the art that any suitable string of predefined values in a predefined order can be used as at least part of the pattern, for example, but not limited to, an RFID serial number (described in more detail with reference to FIG. 13) or configuration bits (described in more detail with reference to FIG. 15).

The operation of the authentication system 66 is now described in more detail.

First, a sample password 74 is preferably provided (block 76) typically by a pseudo-random number generator (not shown).

The password 74 is typically processed by a one-way function producing an output value 78 (block 80).

The output value 78 is then preferably compared with the chip serial number 72 to determine if the output value 78 includes the chip serial number 72 in the appropriate section of the output value 78 (block 82). It should be noted that inclusion of the chip serial number 72 preferably needs to be limited to a section of the output value 78, for example, but not limited to, the beginning of the output value 78, the end of the output value 78 or at some other suitable predefined point in the output value 78.

If there is no pattern match, then the steps of blocks 76-82 are generally repeated (arrow 84).

If there is a pattern match (arrow 86), the sample password 74 is preferably designated as the password 68 for issuing for use in password authentication (block 88) against the output value 78. The output value 78 is preferably designated as a check value 90.

As the check value 90 includes the chip serial number 72, generally only part of the check value 90 needs to be stored in the storage value 70 for future password authentication use. Therefore, the storage value 70 is preferably determined such that the check value 90 can be reconstructed from the storage value 70 and the chip serial number 72 (block 92). In other words, the storage value 70 typically includes the data of the check value 90, but the storage value 70 is generally void of the complete string of data of the chip serial number 72. Therefore, the storage value 70 is generally shorter than the check value 90.

Then, the storage value 70 is preferably stored in a storage medium 96 of the chip 94 for later retrieval (block 98).

Figure 5:
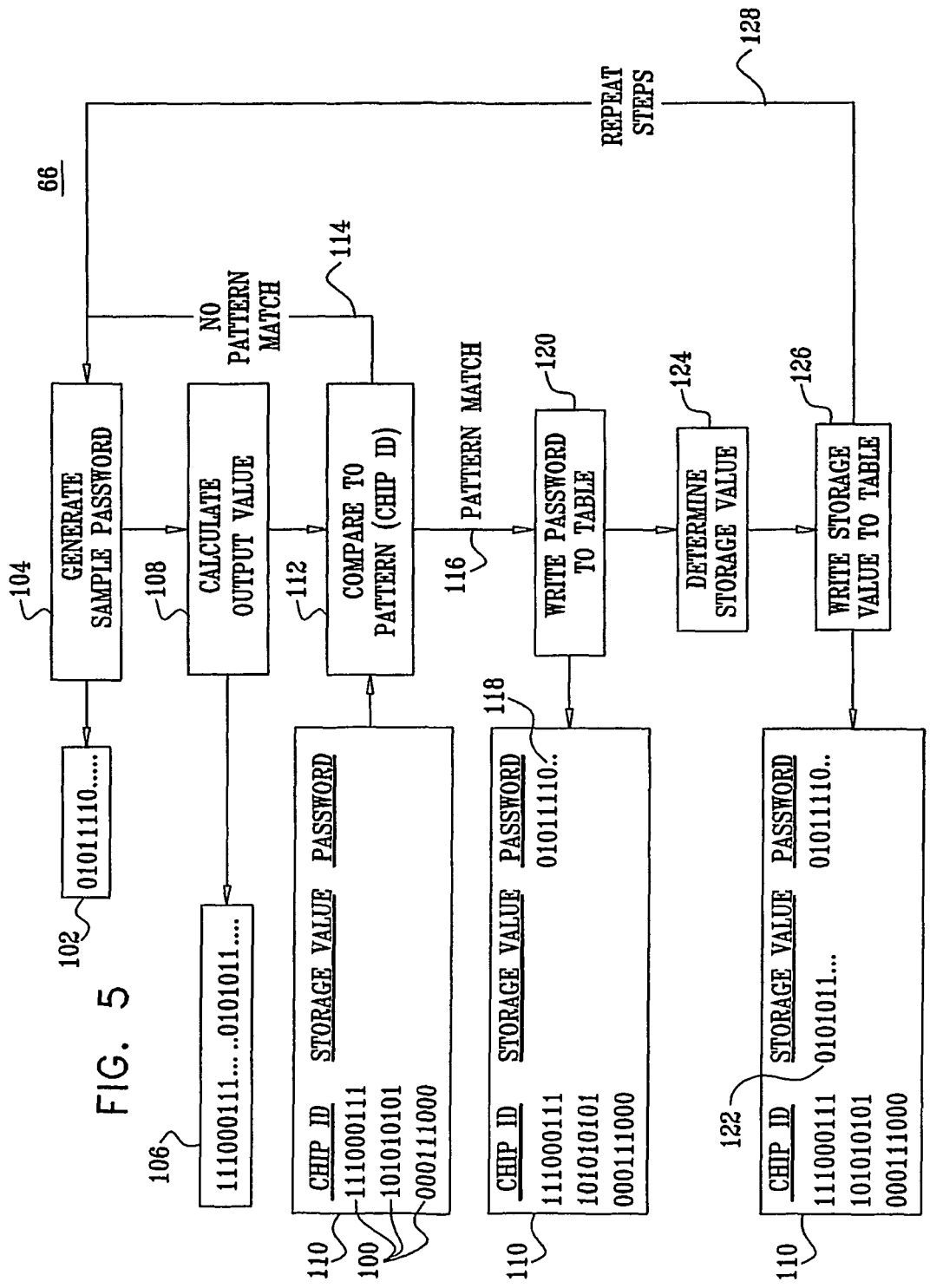
FIG. 5 is a partly pictorial, partly block diagram view of the authentication system of FIG. 4 determining passwords and associated storage values for a plurality of chip serial numbers.

Reference is now made to FIG. 5, which is a partly pictorial, partly block diagram view of the authentication system 66 of FIG. 4 determining passwords and associated storage values for a plurality of chip serial numbers 100.

As described with reference to Fig. $I_5$ there is generally a preprocessing cost associated with determining a password such that the output value has a predetermined pattern. The preprocessing cost typically becomes more significant when passwords are determined in large numbers, for example, for a large of chips where each chip has a unique chip serial number.

Therefore, preprocessing can generally be performed more efficiently by determining passwords on a batch basis as will be described below.

A sample password 102 is preferably generated (block 104), typically using a pseudo-random number generator (not shown).

The sample password 102 is typically processed by the one-way function producing an output value 106 (block 108).

The output value 106 is then generally compared with the chip serial numbers 100 stored in a table 110 to determine if the output value 106 includes any of the chip serial numbers 100 in the appropriate section of the output value 106 (block 112).

If there is no pattern match between the output value 106 and any of the chip serial numbers 100, then the steps of blocks 104-112 are preferably repeated (arrow 114).

If there is a pattern match between the output value 106 and any of the chip serial numbers 100 (arrow 116), the sample password 102 is typically designated as a password 118 for use in password authentication against the output value 106 for the matching chip serial number 100. The password 118 is preferably written to the table 110 such that the password 118 is associated with the matching chip serial number 100 (block 120).

Next, a storage value 122 is typically determined such that a check value (identical to the output value 106) can be reconstructed from the storage value 122 and the matching chip serial number 100 (block 124).

Then, the storage value 122 is preferably written to the table 110 (block 126).

The steps 104-126 are generally repeated (arrow 128) until each of the chip serial numbers 100 in the table 110 are assigned a storage value and a password.

Figure 6:
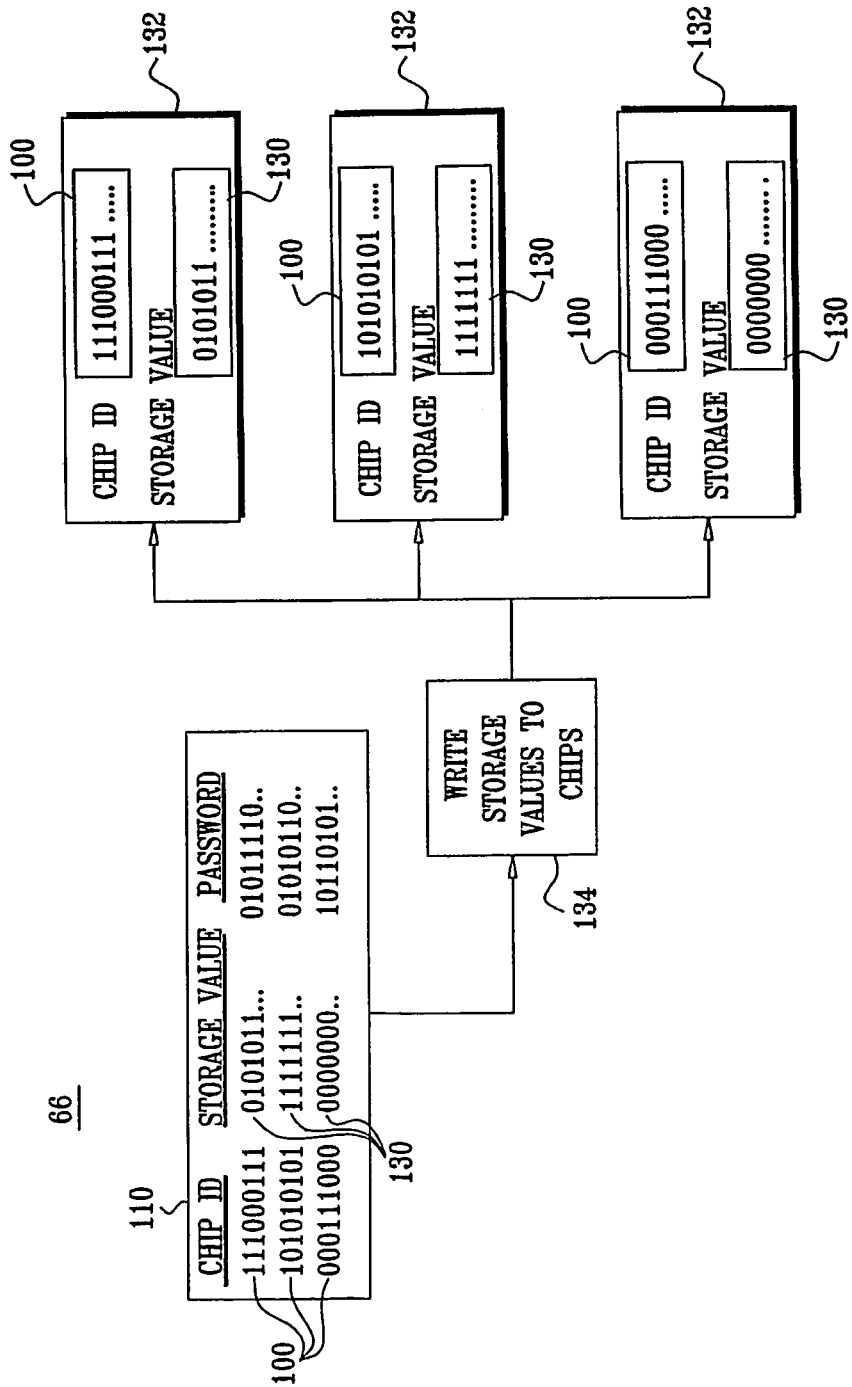
FIG. 6 is a partly pictorial, partly block diagram view of the authentication system of FIG. 4 writing storage values to a plurality of chips.

Reference is now made to FIG. 6, which is a partly pictorial, partly block diagram view of the authentication system 66 of FIG. 4 writing a plurality of storage values 130 to a plurality of chips 132.

Once the table 110 has been populated with storage value and password data, the storage values 130 are preferably written to the respective chips 132, so that each chip 132 receives the storage value 130 associated with the chip serial number 100 of the chip 132 (block 134).

Figure 7:
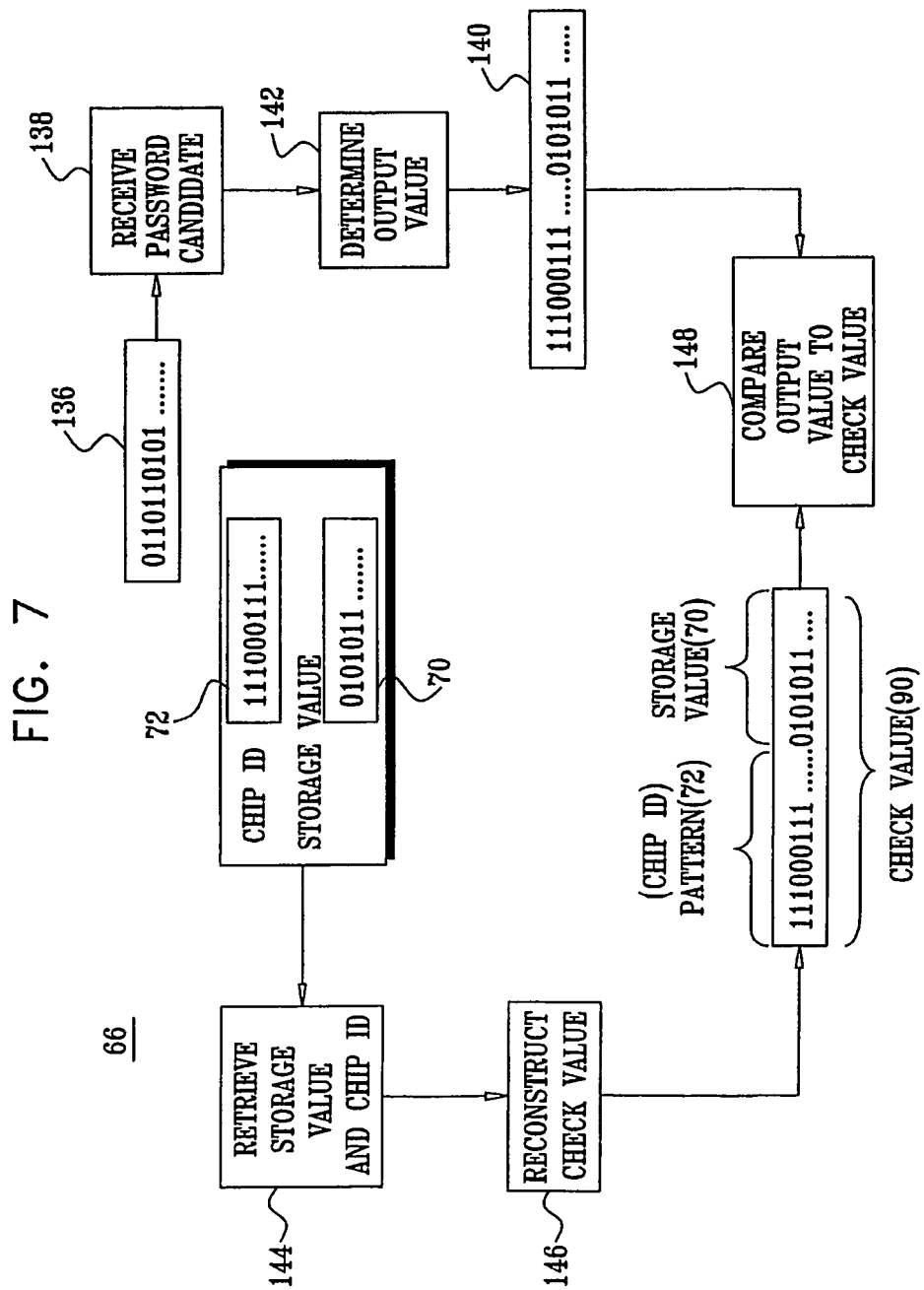
FIG. 7 is a partly pictorial, partly block diagram view of the authentication system of FIG. 4 authenticating a candidate password using the chip serial number of FIG. 4.

Reference is now made to FIG. 7, which is a partly pictorial, partly block diagram view of the authentication system 66 of FIG. 4 authenticating a candidate password 136 using the chip serial number 72 of FIG. 4.

The candidate password 136 for checking against the check value 90 in the password authentication is received (block 138).

An output value 140 is preferably determined using the one-way function with the candidate password 136 as an input value to the one-way function (block 142).

The storage value 70 and the chip serial number 72 are typically retrieved from the storage medium 96 of the chip 94 (block 144).

The check value 90 is generally reconstructed from the storage value 70 and the chip serial number 72 (block 146), by concatenating the storage value 70 and the chip serial number 72 in the example of FIG. 7.

Finally, the output value 140 for the candidate password 136 is preferably compared to the reconstructed check value 90 (block 148).

In accordance with an alternative preferred embodiment of the present invention, the check value 90 is not reconstructed from the storage value 70 and the chip serial number 72. For example, the output value 140 is compared to the storage value 70 and the chip serial number 72.

Figure 8:
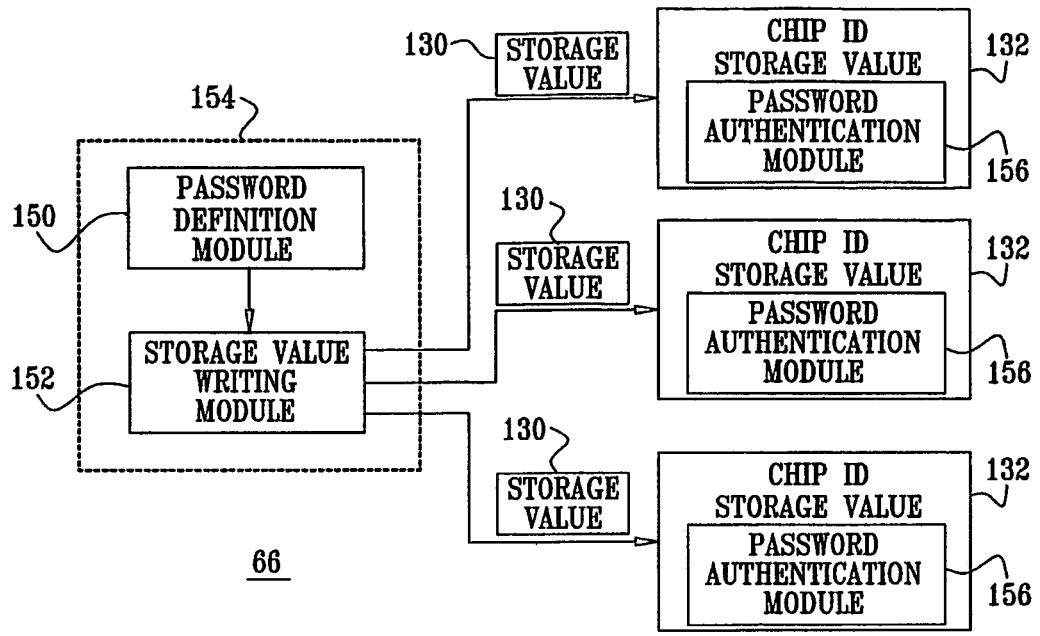
FIG. 8 is a block diagram view showing the arrangement of the modules of the authentication system of FIG. 4.

Reference is now made to FIG. 8, which is a block diagram view showing the arrangement of the modules of the authentication system 66 of FIG. 4.

The authentication system 66 typically includes a password definition module 150 and a storage value writing module 152. The password definition module 150 and the storage value writing module 152 are typically disposed in a single device 154. However, it will be appreciated by those ordinarily skilled in the art that the password definition module 150 and the storage value writing module 152 can be disposed in separate devices.

The password definition module 150 preferably performs the steps described with reference to the blocks 76-98 of FIG. 4 and/or the blocks 104-126 of FIG. 5.

The storage value writing module 152 preferably performs the step described with reference to the block 134 of FIG. 6 for writing the storage values 130 to the chips 132.

The authentication system 66 also typically includes a plurality of password authentication modules 156. Each password authentication module 156 is preferably disposed in one of the chips 132. Each password authentication module 156 generally performs the steps described with reference to the blocks 138-148 of FIG. 7.

A password definition module and a password authentication module, including substantially the same functionality as the password definition module 150 and the password authentication module 156, are. described in more detail with reference to FIGS. 9 and 10, respectively.

Figure 9:
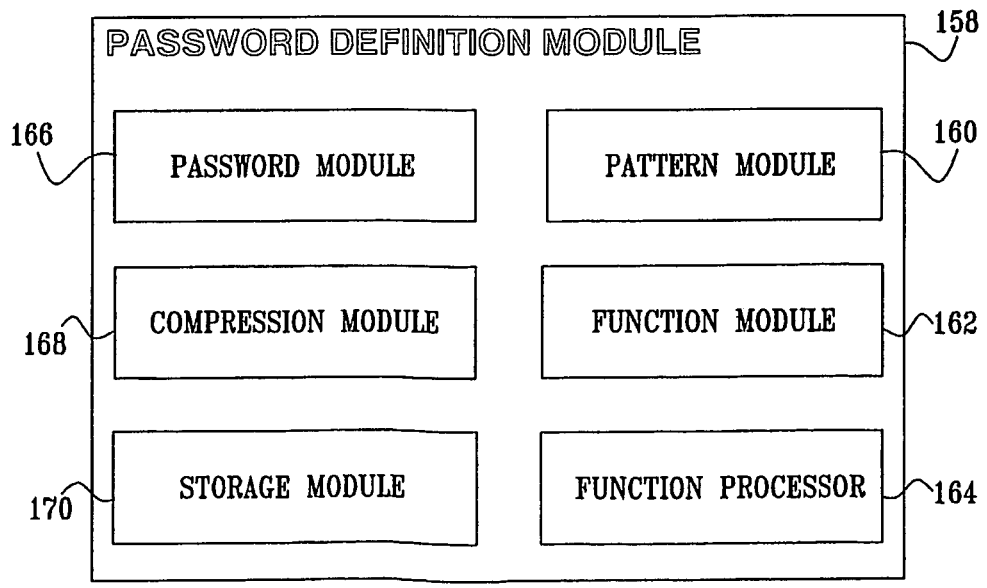
FIG. 9 is a block diagram view of a password definition module for use with the authentication system of FIG. 1 or the authentication system of FIG. 4.

Reference is now made to FIG. 9, which is a block diagram view of a password definition module 158 for use with the authentication system 10 of FIG. 1 or the authentication system 66 of FIG. 4.

The password definition module 158 preferably includes a pattern module 160, a function module 162, a function processor 164, a password module 166, a compression module 168 and a storage module 170.

The pattern module 160 is typically operative to provide a pattern.

The function module 162 is generally operative to provide a one-way function having a plurality of input values and a plurality of output values. The one-way function has been defined hereinabove. The one-way function is typically a cryptographic hash function, for example, but not limited to, SHA-1 or MD5 or any other suitable function, for example, but not limited to the functions described with reference to FIG. 1. The function processor 164 is preferably operative to find an input value for the one-way function such that a corresponding output value has the pattern. The function processor 164 typically determines the input value by a repetitive process including, generating a sample password, generally calculating an output value for the sample password and preferably comparing the output value with the pattern, as described with reference to FIGS. 1 and 4.

The password module 166 is typically operative to provide the input value determined by the function processor 164 as a password for use in password authentication against the output value (designated as a check value) determined by the function processor 164.

The compression module 168 is generally operative to determine a storage value such that: the check value can be reconstructed from the storage value and the pattern; and the length of the storage value is shorter that of the check value. The storage module 170 is preferably operative to store the storage value in the storage medium 40 (FIG. 1) or the storage medium 96 (FIG. 4) for later retrieval.

Figure 10:
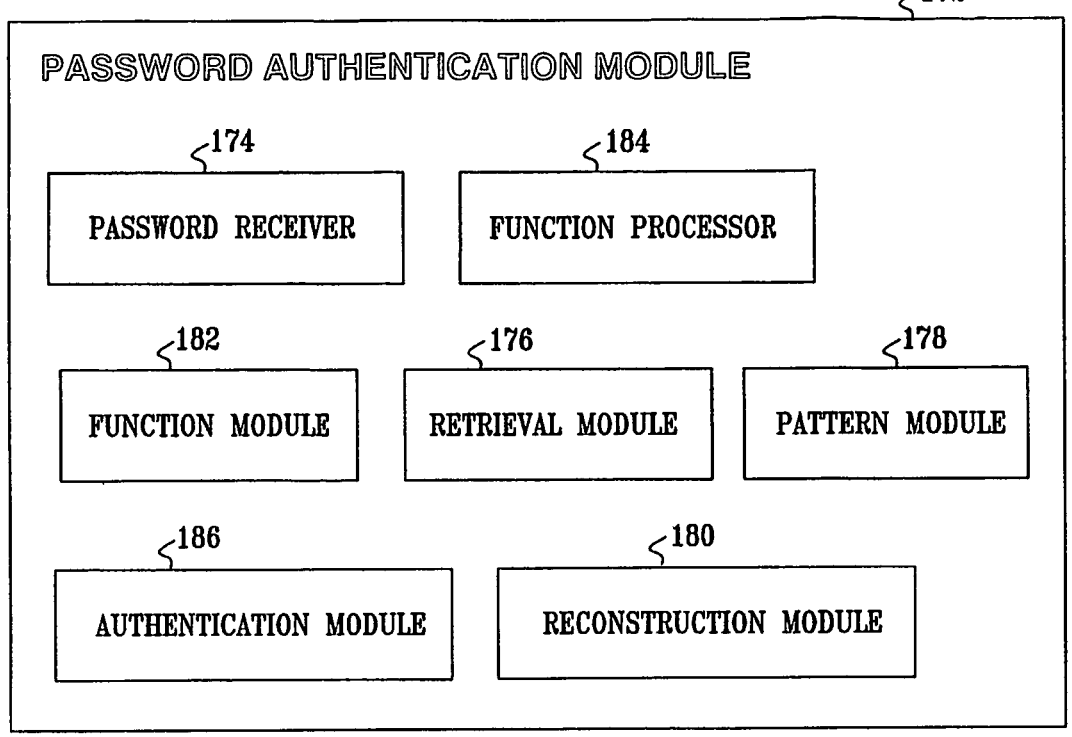
FIG. 10 is a block diagram view of a password authentication module for use with the authentication system of FIG. 1 or the authentication system of FIG. 4.

Reference is now made to FIG. 10, which is a block diagram view of a password authentication module 172 for use with the authentication system 10 of FIG. 1 or the authentication system 66 of FIG. 4. The password authentication module 172 preferably includes a password receiver 174, a retrieval module 176, a pattern module 178, a reconstruction module 180, a function module 182, a function processor 184 and an authentication module 186.

The password receiver 174 is typically operative to receive a candidate password for checking against a check value in password authentication. The retrieval module 176 is generally operative to retrieve a storage value from the storage medium 40 (FIG. 1) or the storage medium 96 (FIG. 4). The pattern module 178 is preferably operative to provide a pattern. The reconstruction module 180 is typically operative to reconstruct the check value from the storage value and the pattern.

The function module 182 is generally operative to provide a one-way function having a plurality of input values and a plurality of output values. The function processor 184 is preferably operative to determine an output value, with the candidate password as the corresponding input value, using the one-way function.

The authentication module 186 is typically operative to compare the output value for the candidate password to the check value.

In accordance with an alternative preferred embodiment of the present invention, the check value is not reconstructed from the storage value; the authentication module 186 is operative to compare the output value for the candidate password with the check value taking into account the pattern based on the indicator, if appropriate, such that the reconstruction module 180 is not generally required. For example, the output value is checked to ensure that the output value has the pattern using the indicator (if appropriate). The output value is then compressed to yield a compressed value which is void of the pattern, typically by a compression module, such as the compression module 168. The compressed value is then compared to the storage value 14 by the authentication module 186.

It will be noted that the when the password definition module 158 and the password authentication module 172 are disposed in a single device, then: the pattern module 178 and the pattern module 160 (FIG. 9) are typically combined into a single unit; the function module 182 and the function module 162 (FIG. 9) are typically combined into a single unit; and the function processor 184 and the function processor 164 are typically combined into a single unit.

Figure 11:
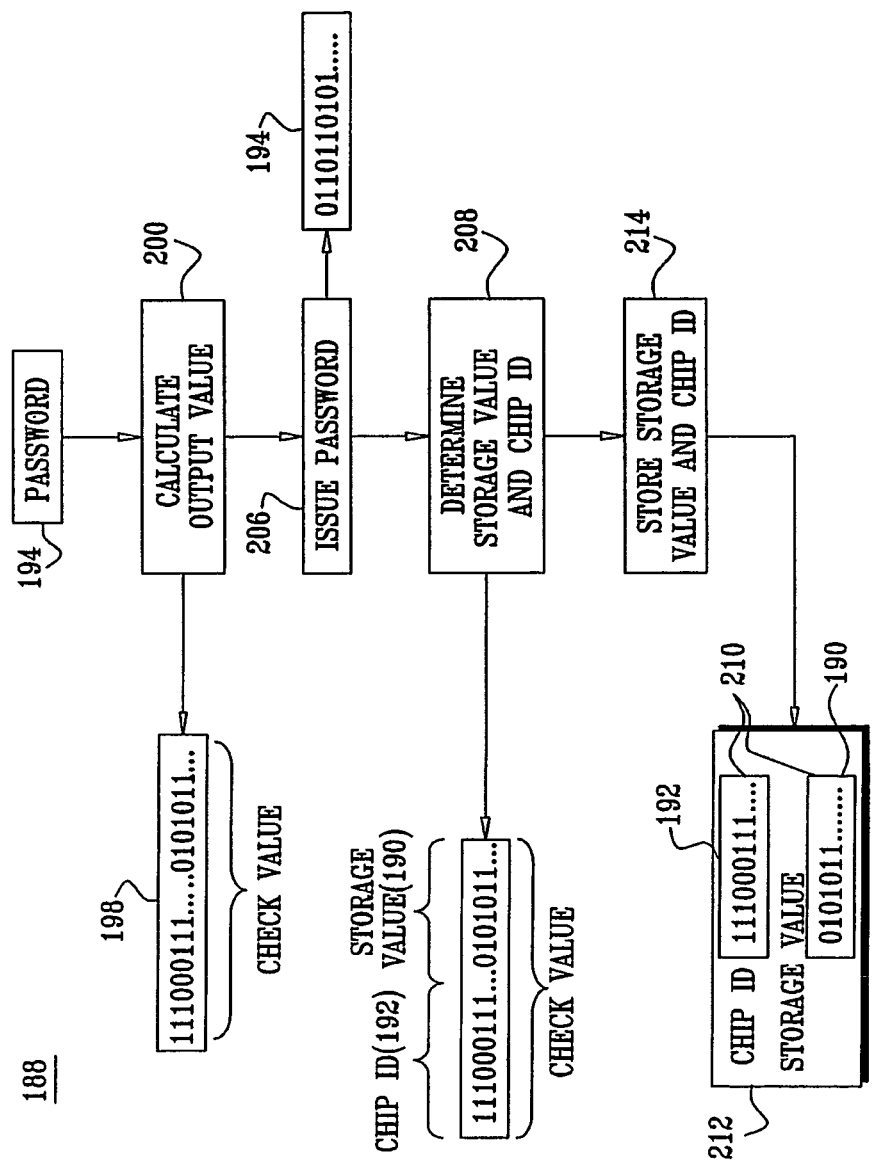
FIG. 11 is a partly pictorial, partly block diagram view of an authentication system constructed and operative in accordance with another alternative preferred embodiment of the present invention determining a storage value and chip serial number based on a password.

By way of introduction, the embodiments described with reference to FIGS. 1-10 assume that part of the check value has a predetermined pattern with or without a non-password use. In contrast, the embodiments described with reference to FIGS. 11 and 12 assume that the check value is typically not restricted by a predetermined pattern. Nevertheless, in both FIGS. 11 and 12 at least part of the check value has a non-password use. In FIG. 11, the check value is preferably determined by processing a password through a one-way function.

Figure 12:
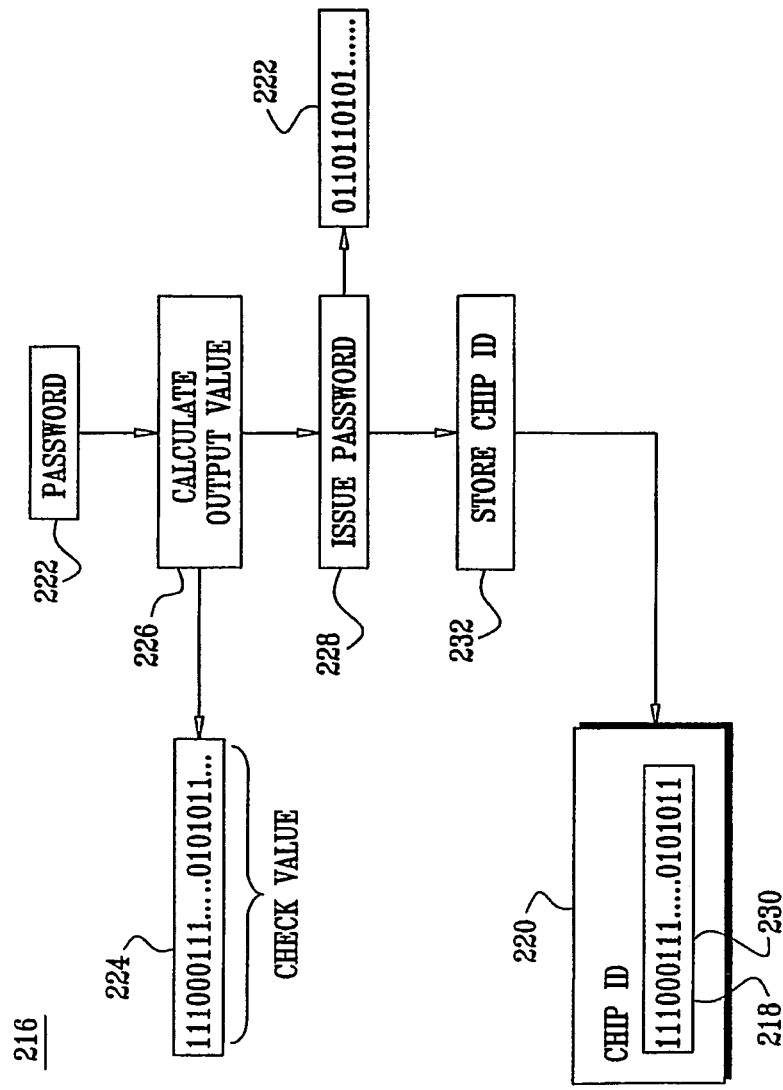
FIG. 12 is partly pictorial, partly block diagram view of an authentication system constructed and operative in accordance with yet another alternative preferred embodiment of the present invention determining a chip serial number based on a password.

Part of the check value is then typically used for a non-password use, such as a chip serial number. In FIG. 12, the entire check value is preferably used for a non-password use.

Reference is now made to FIG. 11, which is a partly pictorial, partly block diagram view of an authentication system 188 constructed and operative in accordance with another alternative preferred embodiment of the present invention determining a storage value 190 and a chip serial number 192 based on a password 196.

The password 196 is typically provided by a pseudo-random number generator (not shown). The password 196 is preferably provided as input to a one-way function, thereby yielding a corresponding output value for use as a check value 198 against the password 196 in password authentication (block 200). The password 196 is then preferably issued to a device (not shown) for later use (block 206).

Then, the check value 198 is typically divided into a storage value 190 and the chip serial number 192 (block 208). For example, the first half of the check value 198 is designated as the chip serial number 192 and the second half of the check value 198 is designated as the storage value 190. Therefore, in the example of FIG. 11, half of the check value 198 has a non-password use (identification) in the form of the chip serial number 192.

The check value 198 is preferably stored, in a storage medium 210 of a chip 212, as the storage value 190 and the chip serial number 192, for later retrieval (block 214). The check value 198 is preferably not stored in the storage medium 210 as a single value.

During password authentication, the chip 212 typically receives a candidate password. The authentication of the candidate password is substantially the same as the authentication process described with reference to FIG. 7.

Reference is now made to FIG. 12, which is partly pictorial, partly block diagram view of an authentication system 216 constructed and operative in accordance with yet another alternative preferred embodiment of the present invention determining a chip serial number 218 for a chip 220 based on a password 222.

The password 222 is typically provided by a pseudo-random number generator (not shown). The password 222 is preferably provided as input to a one-way function, thereby yielding a corresponding output value for use as a check value 224 against the password 222 in password authentication (block 226).

The password 222 is then generally issued to a device (not shown) for later use (block 228).

Then, the chip serial number 218 is preferably assigned the value of the check value 224. The chip serial number 218 is typically stored, in a storage medium 230 of the chip 220, for later retrieval during password authentication (block 232). Therefore, in the example of FIG. 12, the whole check value 198 has a non-password use (for identification) in the form of the chip serial number 224.

During password authentication, the chip 220 preferably receives a candidate password which is processed by the one-way function thereby producing a corresponding output value. The output value associated with the candidate password is then typically compared with the chip serial number 218 which is the check value 224.

Reference is again made to FIGS. 9 and 10.

It will be appreciated that the functions of the authentication system 188 (FIG. 11) and the authentication system 216 (FIG. 12) can be performed by one or more of the elements of the password definition module 158 and the password authentication module 172 of FIGS. 9 and 10, respectively. However, it should be noted that the function processor 164 is preferably operative to determine the check value for the password using the one-way function without reference to a pattern.

Figure 13:
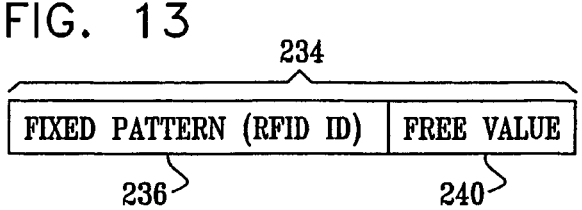
FIG. 13 is a schematic view of a first check value determined by the authentication system of FIG. 1 or by the authentication system of FIG. 4.

Reference is now made to FIG. 13, which is a schematic view of a check value 234 determined by the authentication system 10 of FIG. 1 or by the authentication system 66 of FIG. 4. The check value 234 is preferably formed from a fixed pattern 236 which includes a string of predetermined characters in a predetermined order and a free-value 240 which is determined by the preprocessing of the authentication system 10 or the authentication system 66. In the example of FIG. 13, the string of the fixed pattern 236 is based on a serial number of an RFID tag. However, it will be appreciated by those ordinarily skilled in the art that the fixed pattern 236 can be any suitable fixed pattern.

By way of introduction, radio frequency identification (RFID) is an automatic identification method, relying on storing and remotely retrieving data using devices called RFID tags or transponders. An RFID tag is an object that can be attached to, or incorporated into, a product, animal, or person. RFID tags typically contain silicon chips and an antenna to enable the tags to receive and respond to radio-frequency queries from an RFID transceiver. Passive tags typically require no internal power source, whereas active tags require a power source. RFID tags preferably include a password protected "kill" switch so the tag can be destroyed, or made non-operational, for example, for later transitioning to a new chip. RFID chips including 24 bit and 32 bit kill and access passwords are commercially available from Impinj Inc. of 701 N. 34th Street, Suite 300, Seattle, Wash. 98103 US.

A 32 bit password is generally not very secure. However, most inexpensive RFID tags have very limited storage space. Therefore, increasing the length of the password is typically very difficult.

The teachings of the present invention can be applied to provide a longer check value, for example, but not limited to, a 64 bit check value. The check value 234 is preferably formed from the storage value 240 of 32 bits (free value) and a fixed pattern 236 formed from a 32 bit RFID serial number. As the RFID already includes the RFID serial number, the extra 32 bits of security provided by using the RFID serial number in the check value 234 does not require any additional storage space in the RFID. Therefore, a secure password can make use of the RFID serial number in order to increase security of the kill password or any other password in the RFID tag.

Figure 14:
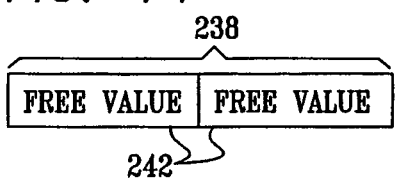
FIG. 14 is a schematic view of a second check value determined by the authentication system of FIG. 1 or by the authentication system of FIG. 4.

Reference is now made to FIG. 14, which is a schematic view of a check value 238 determined by the authentication system 10 of FIG. 1 or by the authentication system 66 of FIG. 4. The check value 238 is preferably formed from two free values 242. The free values 242 are typically determined by the authentication system 10 or the authentication system 66 such that the free values 242 are related to each other as defined by a pattern. For example, the free values 242 can be equal to each other, the free values 242 can be opposite to each other or the free values 242 may be related through any suitable function.

Figure 15:
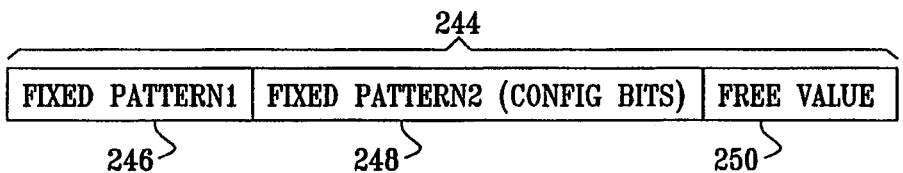
FIG. 15 is a schematic view of a third check value determined by the authentication system of FIG. 1 or by the authentication system of FIG. 4.

Reference is now made to FIG. 15, which is a schematic view of a check value 244 determined by the authentication system 10 of FIG. 1 or by the authentication system 66 of FIG. 4. The check value 244 generally includes two fixed patterns, a pattern 246 and a pattern 248 and a free-value 250. The pattern 246 and the pattern 248 can include any suitable fixed pattern. By way of a non-limiting example, the pattern 246 includes twenty zeros and/or ones (20 bits) and the pattern 248 includes a string that forms at least part of a set of configuration bits (12 bits by way of example only). The configuration bits typically form part of the one-time programmable (OTP) memory of a chip. The free-value 250 is determined by the authentication system 10 or by the authentication system 66 based on the pattern 246 and the pattern 248. By way of example only, the free-value 250 has 32 bits. Therefore, the check value 244 has 64 bits.

Figure 16:
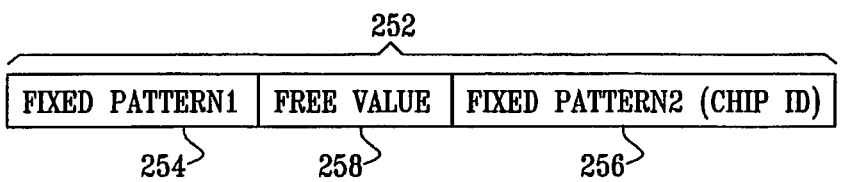
FIG. 16 is a schematic view of a fourth check value determined by the authentication system of FIG. 1 or by the authentication system of FIG. 4.

Reference is now made to FIG. 16, which is a schematic view of a check value 252 determined by the authentication system 10 of FIG. 1 or by the authentication system 66 of FIG. 4. The check value 252 typically includes two fixed patterns, a fixed pattern 254 and a fixed pattern 256 as well as a free value 258. The fixed pattern 254 and the fixed pattern 256 are typically located either side of the free value 258 in the check value 252. The fixed pattern 254 and the fixed pattern 256 can include any suitable fixed pattern. By way of a non-limiting example, the fixed pattern 254 includes 16 zeros and/or ones (16 bits) and the fixed pattern 256 includes a string that forms at least part of a chip serial number (16 bits). The free-value 258 is preferably determined by the authentication system 10 or by the authentication system 66 based on the fixed pattern 254 and the fixed pattern 256. By way of example only, the free-value 258 has 40 bits. Therefore, the check value 252 has 72 bits.

Figure 17:
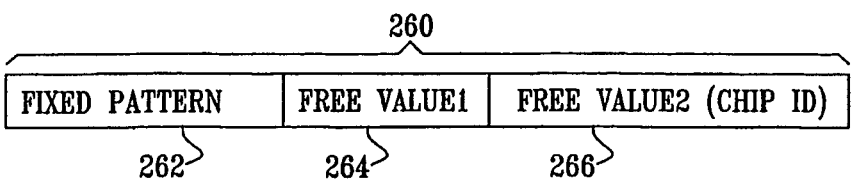
FIG. 17 is a schematic view of a fifth check value determined by the authentication system of FIG. 1 or by the authentication system of FIG. 4.

Reference is now made to FIG. 17, which is a schematic view of a check value 260 determined by the authentication system 10 of FIG. 1 or by the authentication system 66 of FIG. 4. The check value 260 preferably includes a fixed pattern 262, a free value 264 and a free value 266. The fixed pattern 262 can be any suitable fixed pattern, for example, but not limited to, a predetermined string of zeros and/or ones. The free value 264 and the free value 266 are typically determined by the authentication system 10 or by the authentication system 66 based on the fixed pattern 262. In the example of FIG. 17, the free value 264 is only used for password authentication, whereas the free value 266 has a non-password use, for example, but not limited to, for identification, such as a chip serial number. The length of the check value 260 is preferably greater than 64 bits and the length of the fixed pattern 262 is preferably less than 48 bits. If the fixed pattern 262 is too large the preprocessing stage generally takes too long. If the check value 260 is too short, security may be compromised.

It is appreciated that software components of the present invention may, if desired, be implemented in ROM (read only memory) form. The software components may, generally, be implemented in hardware, if desired, using conventional techniques.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination. It will also be appreciated by persons skilled in the art that the present invention is not limited by what has been particularly shown and described hereinabove. Rather the scope of the invention is defined only by the claims which follow.

What is claimed is:

1. An authentication system to generate a useable password for use in secured systems, comprising processing machinery to:

(A) automatically generate a sample password; then
(B) input the sample password into a one-way function yielding an output value; and then
(C) compare the output value to a predetermined pattern wherein:
  (i) if the output value does not have the predetermined pattern, repeat (A) to (C); and
  (ii) if the output value has the predetermined pattern, then:
    (a) issue the sample password as the useable password;
    (b) issue the output value as a check value for use in authenticating the useable password when used in secured system;
    (c) determine a storage value from the check value based on the pattern so that: the storage value is shorter than the check value; and the check value can be reconstructed based on the storage value and the predetermined pattern; and
    (d) store the storage value in a storage medium.

2. The system according to claim 1, wherein the storage value includes an indicator of the predetermined pattern.

3. The system according to claim 1, wherein the predetermined pattern includes a string of predefined values in a predefined order.

4. The system according to claim 3, wherein the storage value is void of the complete string.

5. The system according to claim 2, wherein the string has a non-password use.

6. The system according to claim 5, wherein the non-password use is for identification.

7. The system according to claim 1, wherein at least part of the storage value has a non-password use.

8. The system according to claim 7, wherein the non-password use is for identification.

9. The system according to claim 1, wherein the one-way function is a cryptographic hash function and wherein the output value is a hash value.

10. A password generation method to generate a useable password for use in secured systems, comprising performing the following with processing machinery:

(A) automatically generating a sample password; then
(B) inputting the sample password into a one-way function yielding an output value; and then
(C) comparing the output value to a predetermined pattern wherein:
  (i) if the output value does not have the predetermined pattern, repeating (A) to (C); and
  (ii) if the output value has the predetermined pattern, then:
    (a) issuing the sample password as the useable password;
    (b) issuing the output value as a check value for use in authenticating the useable password when used in secured system;
    (c) determining a storage value from the check value based on the pattern so that: the storage value is shorter than the check value; and the check value can be reconstructed based on the storage value and the predetermined pattern; and
    (d) storing the storage value in a storage medium.

* * * * *